(12) United States Patent
Yamaji et al.

(10) Patent No.: US 8,419,052 B2
(45) Date of Patent: Apr. 16, 2013

(54) MOUNTING SECTION STRUCTURE FOR AIRBAG DEVICE

(75) Inventors: Naoki Yamaji, Settsu (JP); Nobuhiko Yoshii, Settsu (JP); Keita Yamauchi, Settsu (JP)

(73) Assignee: Ashimori Industry Co., Ltd., Osaka-shi (JP)

( * ) Notice: Subject to any disclaimer, the term of this patent is extended or adjusted under 35 U.S.C. 154(b) by 0 days.

(21) Appl. No.: 13/578,295

(22) PCT Filed: Feb. 17, 2011

(86) PCT No.: PCT/JP2011/053342
§ 371 (c)(1),
(2), (4) Date: Aug. 10, 2012

(87) PCT Pub. No.: WO2011/111492
PCT Pub. Date: Sep. 15, 2011

(65) Prior Publication Data
US 2012/0306184 A1 Dec. 6, 2012

(30) Foreign Application Priority Data
Mar. 12, 2010 (JP) .................................. 2010-055385

(51) Int. Cl.
*B60R 21/16* (2006.01)
(52) U.S. Cl.
USPC ...................... 280/731; 280/728.2; 280/728.3
(58) Field of Classification Search ............... 280/728.2, 280/728.3, 731
See application file for complete search history.

(56) References Cited

U.S. PATENT DOCUMENTS

| 7,055,854 B2 * | 6/2006 | Jones et al. | 280/731 |
| 7,159,898 B2 * | 1/2007 | Thomas | 280/731 |
| 7,380,817 B2 * | 6/2008 | Poli et al. | 280/731 |
| 7,398,994 B2 * | 7/2008 | Poli et al. | 280/731 |

(Continued)

FOREIGN PATENT DOCUMENTS

| FR | 2790044 | 8/2000 |
| JP | 9 69693 | 3/1997 |

(Continued)

OTHER PUBLICATIONS

International Preliminary Report on Patentability issued Sep. 27, 2012 in PCT/JP2011/053342 filed Feb. 17, 2011.

(Continued)

*Primary Examiner* — Toan To
(74) *Attorney, Agent, or Firm* — Oblon, Spivak, McClelland, Maier & Neustadt, L.L.P.

(57) ABSTRACT

An airbag device includes an airbag, an inflator, and a mounting plate. A steering wheel includes a wheel main body and a core member as a central member. A mounting member is provided to any one of the mounting plate side and the core member side, and a locking body is provided to the other thereof. The mounting member includes a column part and a locking protrusion provided in a protruding manner to a distal end portion of the column part. The locking body is locked with an inner corner portion between the column part and the locking protrusion, whereby the airbag device is mounted to the steering wheel. A locking abutment surface of the locking protrusion, which faces a proximal end portion of the column part, includes a slip-off prevention protrusion that holds the locking body on the proximal-end-portion side of the locking protrusion.

8 Claims, 15 Drawing Sheets

U.S. PATENT DOCUMENTS

| | | | |
|---|---|---|---|
| 7,464,959 B2 * | 12/2008 | Pillsbury et al. | 280/731 |
| 7,513,527 B2 * | 4/2009 | Lube et al. | 280/736 |
| 7,789,415 B2 * | 9/2010 | Groleau et al. | 280/728.2 |
| 2001/0054810 A1 | 12/2001 | Sakane et al. | |
| 2002/0113419 A1 * | 8/2002 | Kai et al. | 280/731 |
| 2003/0047922 A1 * | 3/2003 | Ford et al. | 280/731 |
| 2004/0017068 A1 | 1/2004 | Weis et al. | |
| 2006/0208470 A1 * | 9/2006 | Tsujimoto et al. | 280/731 |
| 2007/0152428 A1 * | 7/2007 | Poli et al. | 280/728.2 |

FOREIGN PATENT DOCUMENTS

| | | |
|---|---|---|
| JP | 2001 233159 | 8/2001 |
| JP | 2002 12112 | 1/2002 |
| JP | 2003 312426 | 11/2003 |
| JP | 2010 228514 | 10/2010 |
| JP | 2011-102052 A | 5/2011 |
| KR | 10 2005 0021182 | 3/2005 |

OTHER PUBLICATIONS

Translation of the International Preliminary Report on Patentability issued Nov. 1, 2012 in PCT/JP2011/053342 filed Feb. 17, 2011.
Written Opinion issued Mar. 22, 2011 in PCT/JP2011/053342 filed Feb. 17, 2011 (with English-language translation).
International Search Report issued on Mar. 22, 2011 in PCT/JP11/053342 filed on Feb. 17, 2011.
U.S. Appl. No. 13/577,802, filed Aug. 8, 2012, Yamaji, et al.
U.S. Appl. No. 13/579,653, filed Aug. 17, 2012, Yamaji, et al.

* cited by examiner

F I G. 2
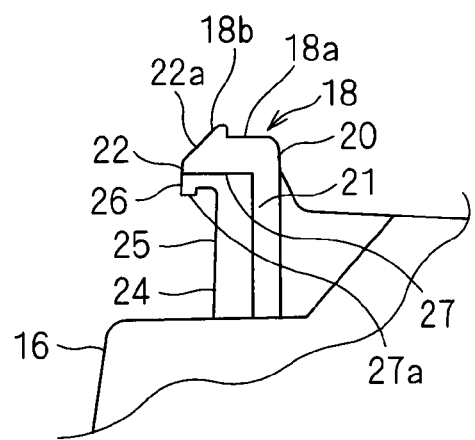
F I G. 3
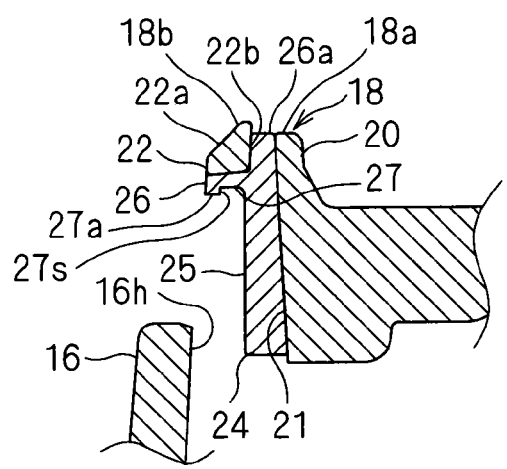

MOUNTING SECTION STRUCTURE FOR AIRBAG DEVICE

TECHNICAL FIELD

The present invention relates to the technology of mounting an airbag device to a steering wheel.

BACKGROUND ART

Conventionally, Patent Document 1 discloses the technology of mounting an airbag device to a steering wheel.

According to Patent Document 1, pins are provided to any one of a base plate that supports a back body to be inflated and deployed and a steering wheel. A lock groove, which has an opening with an approximately trapezoidal-shaped cross section in side view and a width gradually increasing toward the opening direction, is formed in the pin. In addition, mounting parts into which the pins can be inserted are provided in the other of the base plate and the steering wheel. A switch wire serving as a lock member is mounted to the mounting parts. Then, the pins are inserted into the mounting parts, whereby the switch wire is engaged with the engaging grooves of the pins, which keeps the state in which the base plate and the steering wheel are installed, that is, the state in which the airbag device is mounted.

PRIOR ART DOCUMENT

Patent Document
    Patent Document 1: Japanese Patent Application Laid-Open No. 2001-233159

SUMMARY OF THE INVENTION

Problem to be Solved by the Invention

According to Patent Document 1, however, the lock groove having an opening width that gradually increases toward the opening direction is formed in the pin, and the airbag device is mounted when the switch wire is engaged with the lock grooves. For this reason, if the force acts on the base plate and the steering wheel in the direction in which they become apart from each other, the switch wire is pressed against the inclined surfaces of the lock grooves, leading to a fear that the engaged state between the lock grooves and the switch wire may be lost.

Therefore, an object of the present invention is to keep the state in which an airbag device is mounted more reliably.

Means to Solve the Problem

In order to solve the above-mentioned problem, a first aspect relates to a mounting part structure for an airbag device, for mounting an airbag device to a steering wheel, which includes: an airbag device including an airbag, an inflator configured to inflate and deploy the airbag, a cover covering the airbag folded, and a mounting plate to which the airbag, the inflator, and the cover are secured; and a steering wheel including a wheel main body, and a central member provided at the center of the wheel main body, wherein: a mounting member is provided on any one of the mounting plate side and the central member side; a locking body configured to be locked with the mounting member is provided on the other of the mounting plate side and the central member side; the mounting member includes a column part and a locking protrusion, the column part extending from any one of the mounting plate side and the central member side to the other thereof, the locking protrusion being provided in a protruding manner to a distal end portion of the column part; the airbag device is mounted to the steering wheel upon locking of the locking body with an inner corner portion between the column part and the locking protrusion of the mounting member; and a locking abutment surface of the locking protrusion includes a slip-off prevention protrusion holding the locking body on a proximal-end-portion side of the locking protrusion, the locking abutment surface facing a proximal-end-portion side of the column part.

According to a second aspect, in the mounting part structure for an airbag device of the first aspect, the slip-off prevention protrusion is formed as a protrusion protruding at a distal end portion of the locking abutment surface or an inclined protrusion protruding gradually from a proximal end portion of the locking abutment surface toward the distal end portion thereof.

According to a third aspect, in the mounting part structure for an airbag device of the first or second aspect, the locking body is formed of a metal wire configured to be elastically deformed, and is held on the mounting plate or the central member so as to exert a biasing force on the proximal-end-portion side of the locking protrusion of the mounting member.

According to a fourth aspect, in the mounting part structure for an airbag device of any one of the first to third aspects, the mounting member includes: a mounting body member formed of metal and including a column body part and a locking body protrusion protruding from the column body part; and a cap member formed of a non-conductive member and including a side plate part and an end plate part, the side plate part covering a surface of the column body part on the side on which the locking body protrusion protrudes, the end plate part covering an inwardly facing surface of the locking body protrusion; and the slip-off prevention protrusion is formed in the cap member.

According to a fifth aspect, in the mounting part structure for an airbag device of the fourth aspect: a through hole is formed to be opposed to the locking body protrusion, on the mounting plate side or the central member side on which the mounting body member is formed; the side plate part includes a slip-off prevention piece inclined outwardly toward a proximal end portion thereof, and the cap member is formed so as to be inserted into the through hole while elastically deforming the slip-off prevention piece inwardly; and the cap member is mounted to the mounting body member in a state in which the end plate part abuts against the locking body protrusion and the slip-off prevention piece abuts against a periphery of the through hole.

According to a sixth aspect, in the mounting part structure for an airbag device of the fourth or fifth aspect, a positioning recess is formed in the inwardly facing surface of the locking body protrusion, and a positioning protrusion configured to be fitted into the positioning recess is formed in the end plate part, the positioning protrusion being fitted into the positioning recess in a state in which the cap member is mounted to the mounting body member.

According to a seventh aspect, in the mounting part structure for an airbag device of any one of the first to sixth aspects: the locking body is provided in the mounting plate; and the mounting member is provided in the central member.

According to an eighth aspect, in the mounting part structure for an airbag device of any one of the first to seventh aspects, which further includes a holding member formed of a non-conductive member and holding the locking body in a non-contact state with the mounting plate or the central member.

EFFECTS OF THE INVENTION

According to the first aspect, the locking body is held on the proximal-end-portion side of the locking protrusion by the slip-off prevention protrusion of the locking protrusion. Accordingly, the locking state between the locking body and the mounting member is kept more reliably, which enables to keep the mounting state of the airbag device more reliably.

According to the second aspect, the locking body abuts against the protrusion or abuts against the inclined surface of the inclined protrusion, whereby the locking body is held on the proximal-end-portion side of the locking protrusion.

According to the third aspect, the locking body is formed of a metal wire configured to be elastically deformed, which enables the locking body itself to generate a biasing force on the mounting member. Further, the locking body is biased against the proximal-end-portion side of the locking protrusion by the biasing force, which increases the locking force between the mounting member and the locking body.

According to the fourth aspect, adequate rigidity can be secured by the mounting body member formed of metal. Further, the mounting body member and the locking body can be insulated from each other by the cap member formed of a non-conductive member.

According to the fifth aspect, the cap member is inserted into the through hole to pass therethrough, whereby the end plate part abuts against the locking body protrusion and the slip-off prevention piece abuts against the periphery of the through hole. As a result, the cap member is mounted to the mounting body part. This enables to easily mount the cap member to the mounting body member.

According to the sixth aspect, more reliable positioning of the cap member is allowed in the state in which the cap member is mounted to the mounting body member.

According to the seventh aspect, the locking body can be easily incorporated into the mounting plate. Further, the mounting member and the core member can be formed integrally with each other, which reduces a part count.

According to the eighth aspect, the insulated state between the mounting plate and the central member is kept by the holding member formed of a non-conductive member and the cap member formed of a non-conductive member.

BRIEF DESCRIPTION OF DRAWINGS

FIG. 2 is a side view showing a mounting member.

FIG. 3 is a cross-sectional view showing the mounting member.

EMBODIMENT FOR CARRYING OUT THE INVENTION

Figure 1:
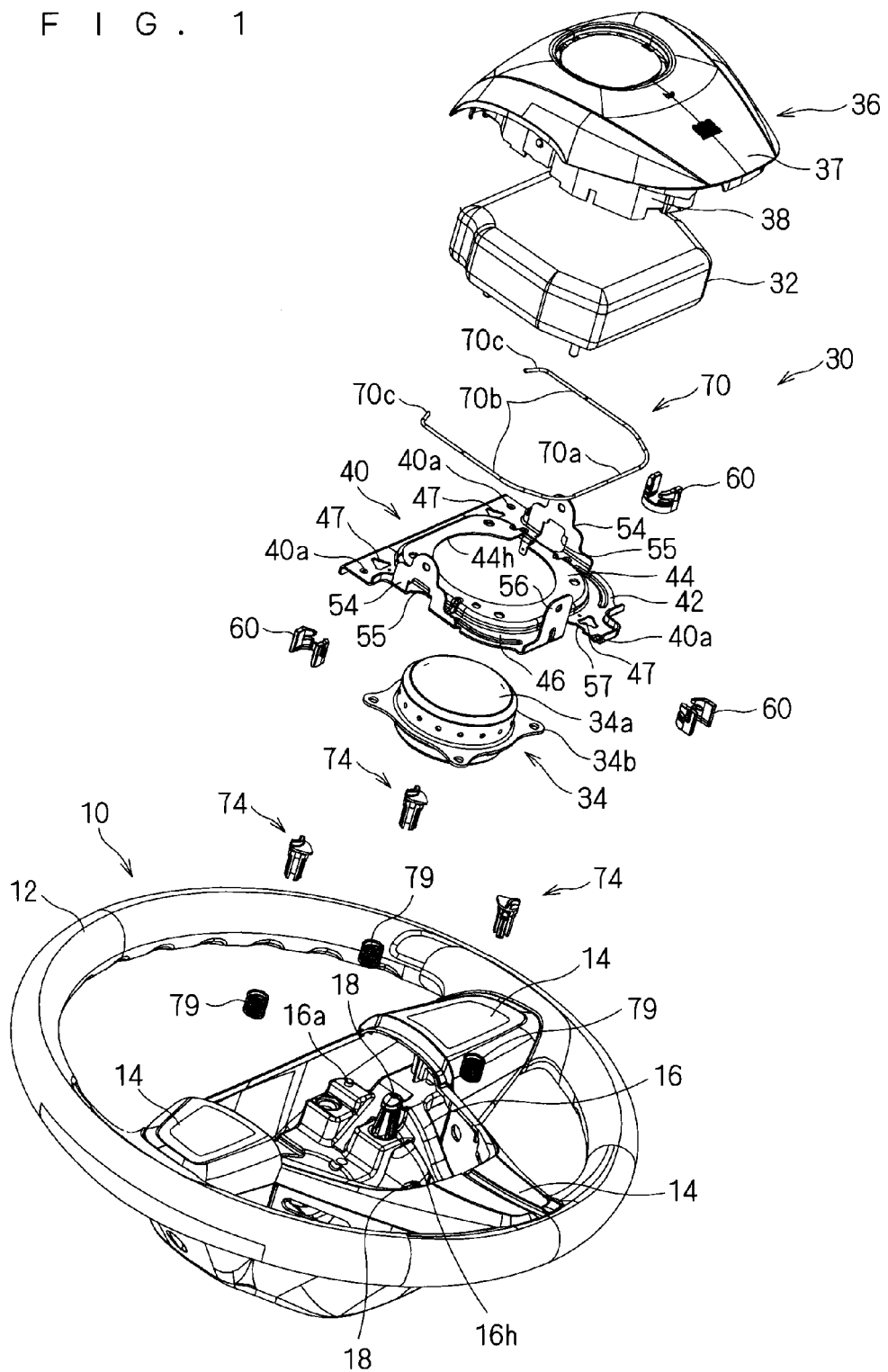
FIG. 1 is an exploded perspective view showing an airbag device according to an embodiment and a steering wheel.
Figure 4:
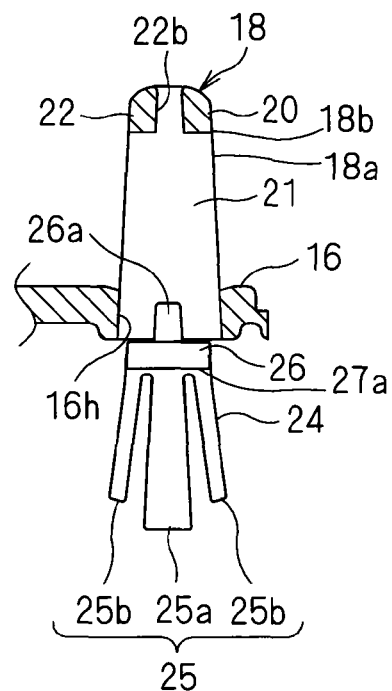
FIG. 4 is an explanatory view showing a procedure of mounting a cap member to a mounting body member.

Hereinafter, a mounting part structure for an airbag device according to an embodiment is described. FIG. 1 is an exploded perspective view showing a steering wheel 10 and an airbag device 30.

The mounting part structure for the airbag device 30 is the structure for mounting the airbag device 30 to the steering wheel 10.

The steering wheel 10 serves to steer a vehicle and includes a wheel main body 12, spokes 14, and a core member 16 as a central member. The wheel main body 12 is a portion that receives a steering force by a person. The spoke 14 is formed into a rod shape extending from an inner peripheral portion of the wheel main body 12 toward the center thereof, and is connected to a steering shaft at the center of the wheel main body 12. Three spokes 14 are provided in this case, which may be, for example, two.

The core member 16 is exposed approximately at the center portion of the steering wheel 10. The core member 16 is formed of a conductive member such as metal. Mounting members 18 are provided to the core member 16 in a protruding manner. In this case, three mounting members 18 are provided around the center of the steering wheel 10 (FIG. 1 shows only a part thereof). Needless to say, there may be provided one mounting member 18 to be locked with a locking body 70 described below, which may be two or more.

FIG. 2 is a side view showing the mounting member 18, and FIG. 3 is a cross-sectional view showing the mounting member 18. FIGS. 4 to 7 are explanatory views showing a procedure of mounting a cap member 24 to a mounting body member 20. The cap member 24 may not be provided.

The mounting member 18 is configured so as to be locked with the locking body 70 described below. The mounting member 18 is configured such that, as an entire shape, a locking protrusion 18b is provided in a protruding manner to a distal end portion of a column part 18a extending from the core member 16 to the mounting plate 40 side.

In this case, the mounting member 18 includes the mounting body member 20 integrally formed with the core member 16, and the cap member 24 mounted to the mounting body member 20.

The mounting body member 20 is formed of the same metal as that of the core member 16 and includes a column body part 21 and a locking body protrusion 22. The column body part 21 is formed so as to protrude from the core member 16 toward the front side of the steering wheel 10 (airbag device 30 side). The locking body protrusion 22 is provided at the distal end of the column body part 21 in a protruding manner. In this case, the locking body protrusion 22 is formed to protrude toward the inner peripheral side of the steering wheel 10. Provided at the distal end portion of the locking body protrusion 22 on the airbag device 30 side is an inclined surface 22a inclined such that a height dimension thereof becomes gradually smaller toward the center of the steering wheel 10. In the mounting state of the airbag device 30 described below, the distal end portion of the mounting member 18 is disposed in an airbag housing space. In this state, the inclined surface 22a functions as an interference suppressing part whose height dimension becomes gradually smaller toward the inside of the airbag housing space. The inclined surface 22a is not necessarily required to be flat but may be curved.

A through hole 16h is formed at the position in the core member 16, which is located in the proximal-end-side portion of the mounting body member 20 and is opposed to the locking body protrusion 22, and a positioning recess 22b is formed in an inwardly facing surface of the locking protrusion 22. The cap member 24 is, for example, mounted with the through hole 16h and the positioning recess 22b. Note that the positioning recess 22b passes through the locking body protrusion 22 in this case, which is not necessarily required to pass therethrough.

The cap member 24 is formed of a non-conductive member such as a resin, and is mounted to the mounting body member 20 so as to cover the inner corner portion of the mounting body member 20 between the column body part 21 and the locking body protrusion 22. More specifically, the cap member 24 includes a side plate part 25 covering the surface of the column body part 21 on the side on which the locking body protrusion 22 protrudes and an end plate part 26 covering the inwardly facing surface of the locking body protrusion 22.

The side plate part 25 includes a center plate part 25a having an elongated plate shape and a pair of slip-off prevention pieces 25b provided at both side portions of the center plate part 25a. The slip-off prevention piece 25b extends in a position to be outwardly inclined so as to gradually widen from the end portion of the center plate part 25a on the end plate part 26 side toward the proximal end portion thereof on the other side. The pair of slip-off prevention pieces 25b are elastically deformed to become narrow, to thereby pass through the through hole 16h. Meanwhile, the pair of slip-off prevention pieces 25b become widened by the elastic restoring force thereof, whereby the end portions of the pair of slip-off prevention pieces 25b can be engaged with the peripheral portion of the through hole 16h.

A locking abutment surface 27 of the end plate part 26, which faces the proximal-end-portion side of the side plate part 25, is configured so as to be locked with the locking body 70 described below in a manner of preventing slip-off. The locking abutment surface 27 includes a slip-off prevention protrusion 27a that holds the locking body 70 on the proximal-end-portion side of the locking abutment surface 27. The slip-off prevention protrusion 27a is formed into a shape to protrude, via a step 27s or gradually, from the portion of the locking abutment surface 27, which is integrally connected to the side plate part 25, toward the proximal-end-portion side of the side plate part 25. When the locking body 70 disposed in an inner corner portion between the locking abutment surface 27 and the side plate part 25 attempts to move in a protruding direction of the locking protrusion 18b, the slip-off prevention protrusion 27a comes into contact with the locking body 70 from the distal-end-portion side of the locking protrusion 18b, thereby preventing the locking body 70 from moving in the protruding direction of the locking protrusion 18b. In this case, the slip-off prevention protrusion 27a is formed into a protrusion shape to protrude via the step 27s, at the distal end portion of the locking abutment surface 27 apart from the proximal end portion thereof toward the distal end side of the locking abutment surface 27 by a larger amount than the diameter of the locking body 70. Further, formed on the outer surface of the end plate part 26 is a positioning protrusion 26a that can be fitted into the positioning recess 22b of the locking body protrusion 22.

Figure 5:
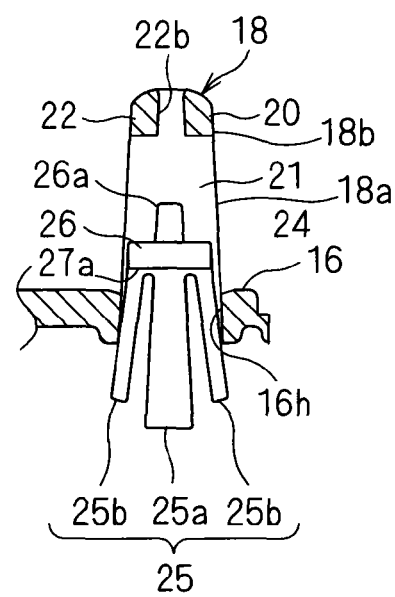
FIG. 5 is another explanatory view showing the procedure of mounting the cap member to the mounting body member.
Figure 6:
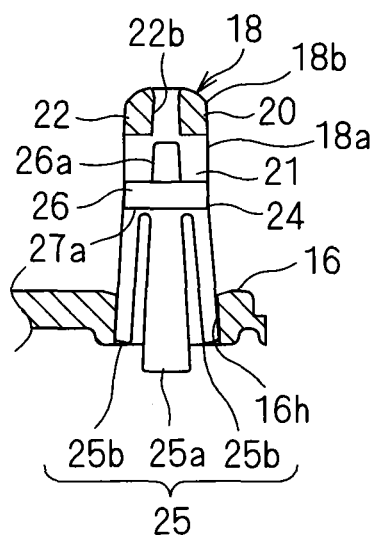
FIG. 6 is still another explanatory view showing the procedure of mounting the cap member to the mounting body member.
Figure 7:
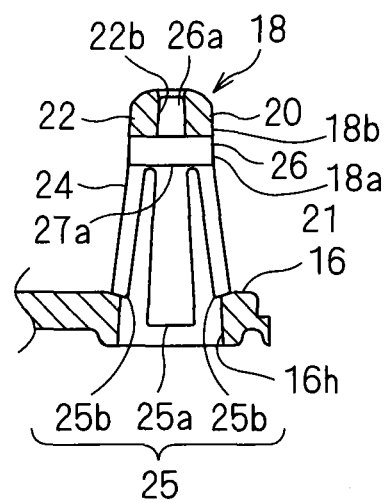
FIG. 7 is yet still another explanatory view showing the procedure of mounting the cap member to the mounting body member.

When the cap member 24 is inserted into the through hole 16h from the proximal end side of the mounting body member 20 (see FIG. 4), the outer surfaces of the pair of slip-off prevention pieces 25b come into sliding contact with the periphery of the through hole 16h, so that the pair of slip-off prevention pieces 25b are elastically deformed toward the center plate part 25a side (inwardly) (see FIG. 5). Accordingly, the pair of slip-off prevention pieces 25b become narrow, which enables the cap member 24 to pass through the through hole 16h (see FIG. 6). Then, the cap member 24 is inserted until the end plate part 26 abuts against the inwardly facing surface of the locking body protrusion 22, whereby the cap member 24 comes out of the through hole 16h. Then, the pair of slip-off prevention pieces 25b elastically return to be engaged with the peripheral portion of the through hole 16h (see FIG. 7). In this state, the positioning protrusion 26a is fitted into the positioning recess 22b. As a result, the cap member 24 is mounted and secured to the mounting body member 20 at a fixed position. Note that the slip-off prevention piece 25b may be provided on only one side.

Figure 8:
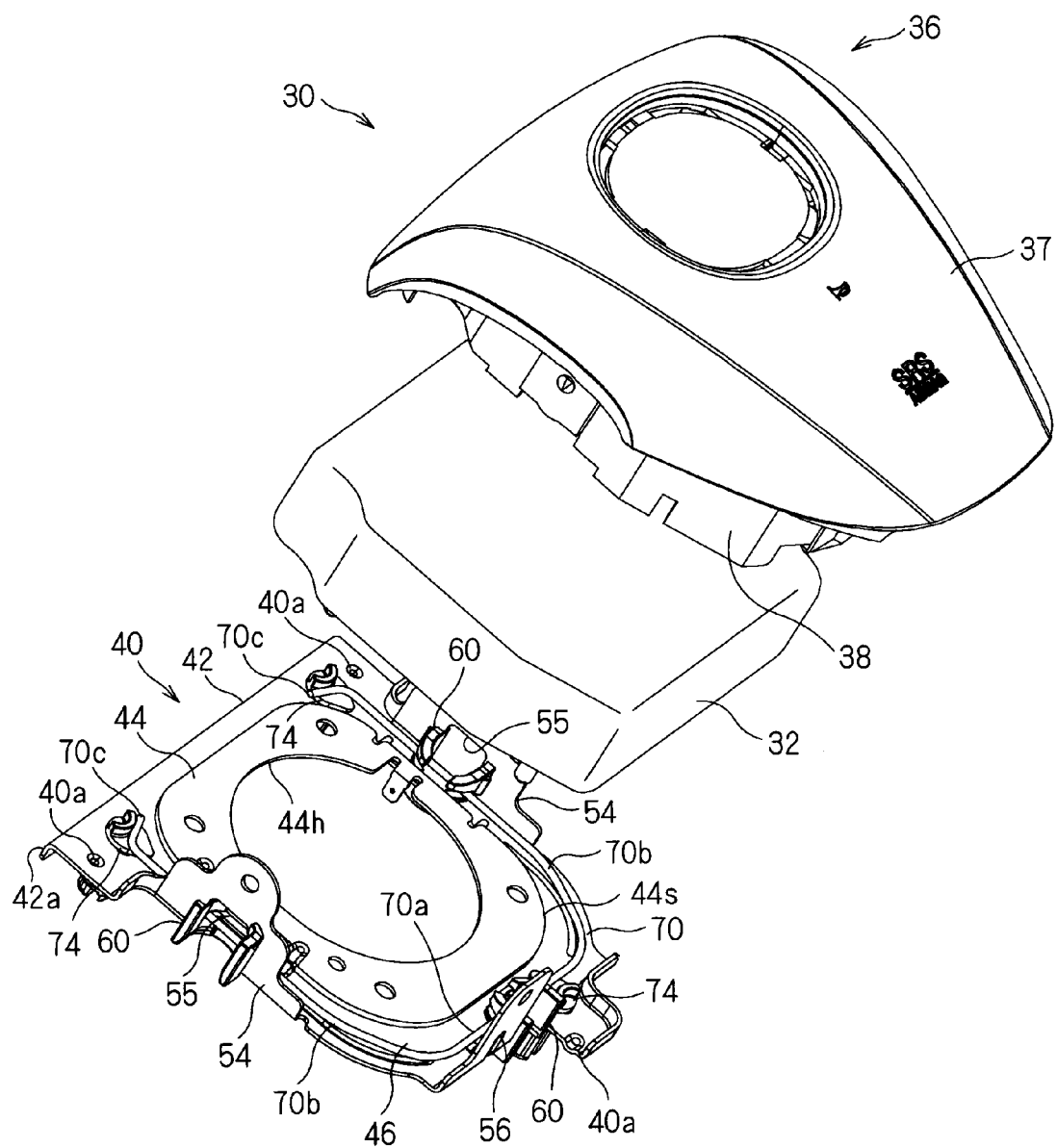
FIG. 8 is an exploded perspective view showing an airbag, a cover, and a mounting plate of the airbag device.

FIG. 8 is an exploded perspective view showing an airbag 32, a cover 36, and a mounting plate 40 of the airbag device 30. As shown in FIGS. 1 and 8, the airbag device 30 includes the airbag 32, the inflator 34, the cover 36, and the mounting plate 40.

The airbag 32 is formed of a fabric or the like into a bag shape, and is mounted to the mounting plate 40 in the folded state together with the inflator 34.

The inflator 34 serves to inflate and deploy the airbag 32. In this case, the inflator 34 includes an inflator body part 34a having a short cylindrical shape and a mounting flange 34b formed on the outer periphery of the inflator body part 34a (see FIG. 1). The mounting flange 34b is formed into a plate shape extending such that the outer perimeter thereof has an approximately square shape, and screw holes are formed at four corner portions thereof. The inflator 34 is mounted and secured to the mounting plate 40 via the mounting flange 34b. An ignition device, a gas generator, and the like are incorporated in the inflator body part 34a. Upon reception of, for example, a detection signal from an impact detection part or the like in a vehicle collision, the ignition device ignites the gas generator. Accordingly, the gas generator burns, and the gas generated as a result of the burning is supplied into the airbag 32.

The cover 36 is a member formed of a resin or the like, which is secured to the mounting plate 40 so as to cover the airbag 32. In this case, the cover 36 includes a cover body part 37 having a gently curved shape and an enclosure part 38 provided on the back surface side of the cover body part 37. The enclosure part 38 and the mounting plate 40 are secured to each other by, for example, riveting. Further, the space for housing the folded airbag 32 is formed in the space surrounded by the cover body part 37 and the enclosure part 38. Tear lines that are easily torn upon reception of the force for inflating and deploying the airbag 32 are formed in the cover body part 37. The cover body 37 is disposed that the surface thereof is continuous from the surfaces of the spokes 14 in the state where the airbag device 30 is mounted to the steering wheel 10.

The mounting plate 40 is a member formed of a metal plate or the like, which is a member to which the airbag 32, the inflator 34, and the cover 36 are mounted. The airbag 32, the inflator 34, and the cover 36 are directly mounted to the mounting plate 40 in this case, which may be indirectly secured thereto via, for example, another bracket. The mounting plate 40 is described below in more detail.

When the airbag 32 is inflated by a gas supply from the inflator 34, the cover 36 is torn and opened upon reception of the force for inflating and deploying the airbag 32. As a result, the airbag 32 is inflated and deployed into a bag shape between the steering wheel 10 and a driver.

The configuration for mounting the airbag device 30 to the steering wheel 10 is described.

Figure 9:
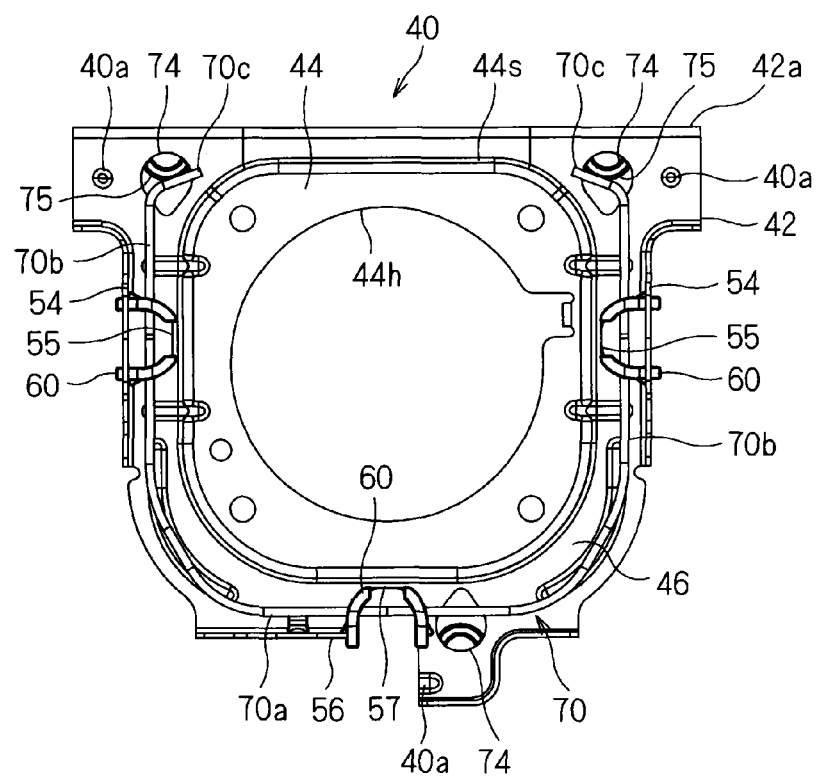
FIG. 9 is a front view showing the mounting plate, a holding member, and a locking body.
Figure 10:
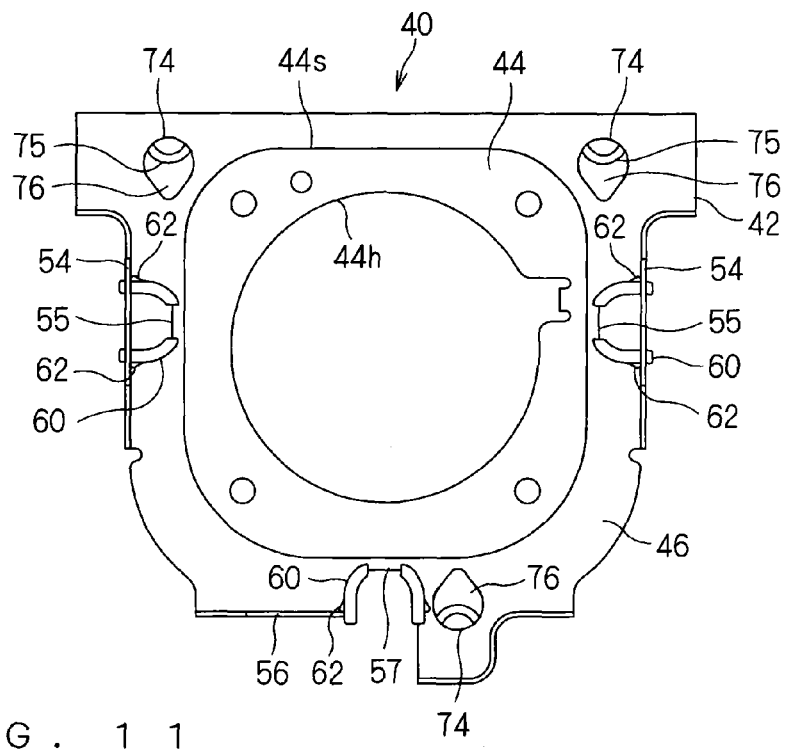
FIG. 10 is a schematic front view showing the mounting plate.
Figure 11:
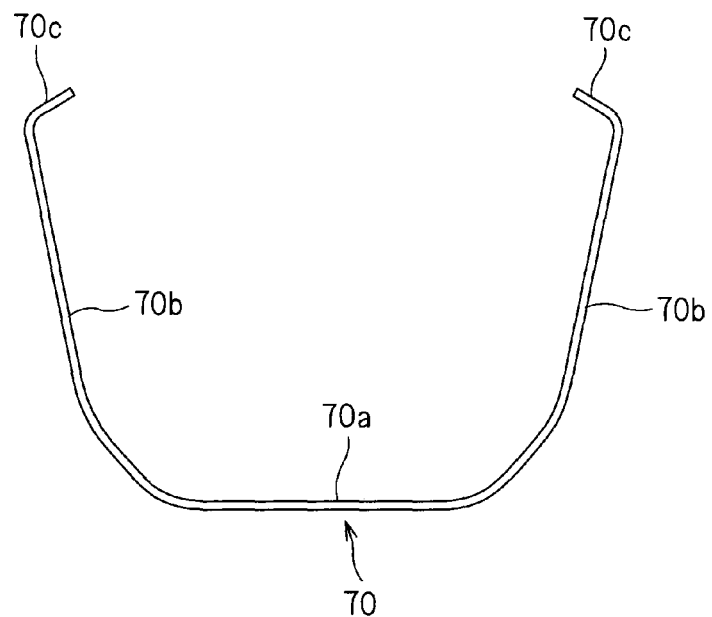
FIG. 11 is a front view showing the locking body.
Figure 12:
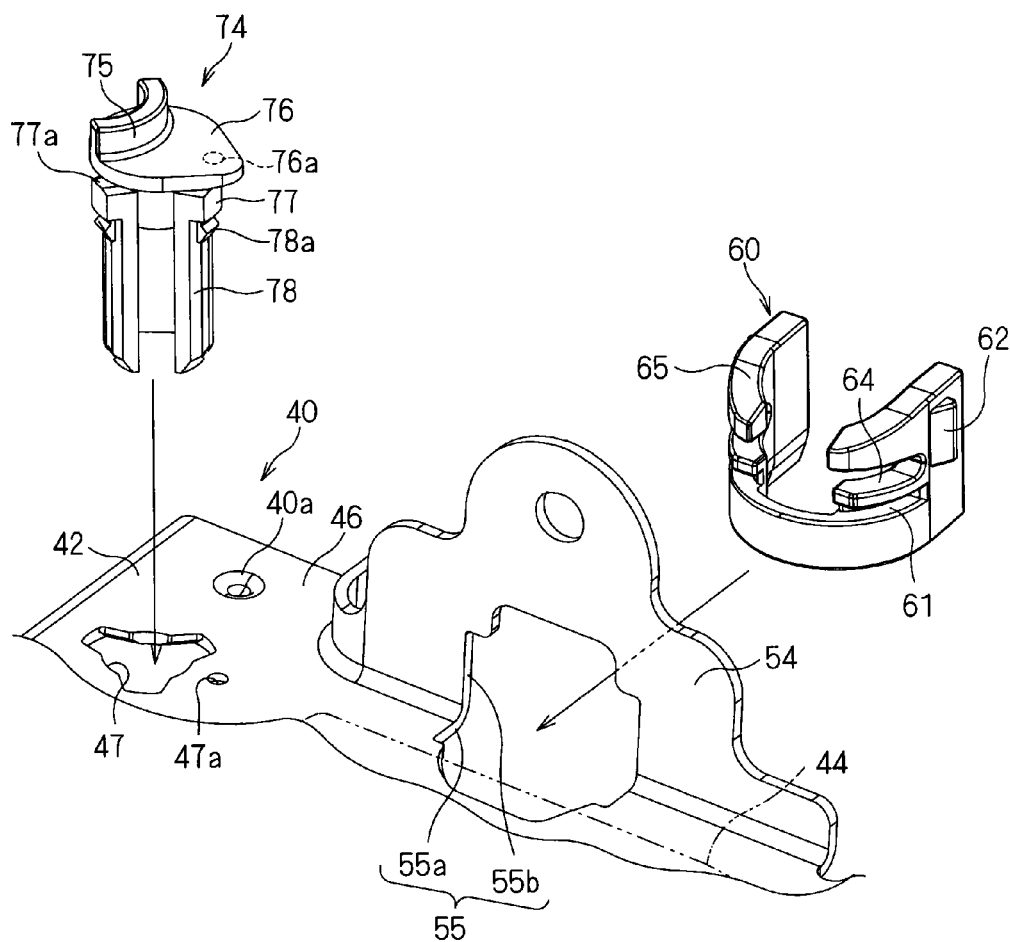
FIG. 12 is an exploded perspective view showing the mounting plate, the holding member, and an auxiliary biasing member.

FIG. 9 is a front view showing the mounting plate 40, the holding members 60, and the locking body 70, FIG. 10 is a schematic front view showing the mounting plate 40, FIG. 11 is a front view showing the locking body 70, and FIG. 12 is an exploded perspective view showing the mounting plate 40, the holding member 60, and an auxiliary biasing member 74.

That is, the locking body 70 is held on the mounting plate 40 of the airbag device 30 via the holding members 60. Then, the mounting members 18 are locked with the locking body 70 in a detachable manner, whereby the airbag device 30 is mounted to the steering wheel 10.

More specifically, the mounting plate 40 is a member formed by, for example, pressing a metal plate, and includes a main mounting plate part 42, side securing plate parts 54, a bottom securing plate part 56, and a top securing plate part 42*a*.

The main mounting plate part 42 is formed into a plate shape large enough to block the opening of the enclosure part 38 of the cover 36. Formed at the center portion of the main mounting plate part 42 is an inflator disposing hole 44*h* in which the inflator body part 34*a* can be disposed. An approximately square-shaped area on the outer periphery of the inflator disposing hole 44*h* is formed as an inflator mounting plate part 44 protruding toward the airbag 32 side via a step 44*s*, beyond the outer periphery of the approximately square-shaped area. In the state in which the inflator body part 34*a* is disposed in the inflator disposing hole 44*h*, the mounting flange 34*b* is overlaid on the inflator mounting plate part 44 and is secured thereto by, for example, screwing, so that the inflator 34 is mounted and secured to the mounting plate 40.

The outer-perimeter-side portion of the inflator mounting plate part 44 is formed as a recess 46 that is recessed from the surface of the inflator mounting plate part 44 on the airbag 32 side toward the steering wheel 10 side via the step 44*s*. In this case, the recess 46 is formed so as to surround the inflator disposing hole 44*h* from four sides. Needless to say, it suffices that the recess is formed in the area that surrounds the inflator disposing hole from at least two directions. It is preferable that the depth dimension of the recess 46 be set to be larger (in this case, much larger) than the radius of the locking body 70, and that the locking body 70 be provided such that more than a half of a cross section thereof should not protrude from the surface of the inflator mounting plate part 44. More preferably, the depth dimension of the recess 46 is set to be larger (in this case, much larger) than the diameter of the locking body 70, and the entire locking body 70 does not protrude from the surface of the inflator mounting plate part 44 but is located at a position below the front surface of the inflator mounting plate part 44 on the recess 46 side.

Here, the locking body 70 is disposed in the recess 46 and is configured to be detachably locked with the mounting member 18. More specifically, the locking body 70 is formed by bending and deforming a metal wire that can be elastically deformed, and has a shape in which an intermediate wire portion 70*a* and a pair of side wire portions 70*b* are continuous so as to form a U-shape. In the initial state before the locking body 70 is mounted to the recess 46 of the mounting plate 40, the pair of side wire portions 70*b* extend beyond the width dimension of the mounting plate 40. In addition, the locking body 70 is mounted in the recess 46 of the mounting plate 40 in the state in which the pair of side wire portions 70*b* are pushed to become narrow. Provided at the distal end portions of the pair of side wire portions 70*b* are inclined wire portions 70*c* that are inclined in a direction in which the pair of wire portions 70*b* become close to each other toward the distal end side thereof. When the inclined wire portions 70*c* come into sliding contact with the auxiliary biasing members 74 in the state in which the locking body 70 is mounted to the mounting plate 40, the force for outwardly biasing the intermediate wire portion 70*a* is exerted.

The locking body 70 is provided in the recess 46 as described above, whereby it is possible to prevent the locking body 70 from protruding from the mounting plate 40 as much as possible. This prevents a hand or the like of an operator from inadvertently coming into contact with the locking body 70 during an operation of mounting the airbag 32, the inflator 34, the cover 36, and the like to the mounting plate 40. In particular, more than a half of the cross section of the locking body 70 does not protrude from the surface of the inflator mounting plate part 44 on the airbag 32 side, which prevents a hand or the like of an operator from coming into contact with the locking body 70 more reliably. Accordingly, it is possible to prevent the locking body 70 from, for example, becoming detached during an assembly operation, which allows smooth execution of the assembly operation.

The recess 46 is provided so as to surround the inflator disposing hole 44*h*. This enables to dispose the locking body 70 so as to surround the inflator 34 and lock the mounting members 18 with the locking body at a plurality of positions (in this case, three positions). This further stabilizes the state in which the airbag device 30 is mounted.

The locking body 70 is provided on the airbag 32 side with respect to the mounting plate 40, and accordingly, the external force by a hand or the like of an operator is unlikely to be exerted on the locking body 70 after the airbag 32, the inflator 34, the cover 36, and the like are mounted to the mounting plate 40 and the airbag device 30 is installed. As a result, the locking body 70 is unlikely to become detached. In addition, the locking body 70 is provided in the recess 46 of the mounting plate 40, which is recessed from the surface of the inflator mounting plate part 44 toward the steering wheel 10 side. This makes it easy to sufficiently secure the space for housing the airbag 32 between the mounting plate 40 and the cover 36. Moreover, the airbag 32 is unlikely to interfere with the locking body 70 disposed in the recess 46 when being inflated and deployed, and accordingly, the airbag 32 is inflated and deployed stably.

The locking body interferes with the folded airbag if the locking body is provided on the airbag side, and thus, a fear arises that the space for enabling elastic deformation of a locking body that is required for mounting/demounting a locking body to/from the mounting member cannot be secured. That is, there arises a fear that a locking body and a folded airbag may interfere with each other and the locking body may not be deformed, which prohibits smooth mounting/demounting of the locking body to/from a mounting member. In the present embodiment, meanwhile, the locking body 70 is provided in the recess 46, and thus, is unlikely to interfere with the folded airbag 32. This allows smooth deformation of the locking body 70. Therefore, the mounting member 18 and the locking body 70 can be mounted/demounted easily.

The configuration for holding the locking body 70 on the mounting plate 40 is further described below.

The pair of side securing plate parts 54 are provided in both side portions of the main mounting plate part 42, and the bottom securing plate part 56 is provided to the bottom of the main mounting plate part 42. The pair of side securing plate parts 54 and the bottom securing plate part 56 are provided so as to extend along the enclosure part 38 toward the cover 36 side. The pair of side securing plate parts 54 and the bottom securing plate part 56 are secured to the enclosure part 38 by, for example, riveting, so that the mounting plate 40 and the cover 36 are secured to each other. Note that the top securing plate part 42a that extends toward the side opposite to the cover 36 is also provided to the top of the main mounting plate part 42, and the top securing part 42a is also secured to the cover 36 by riveting, screwing or the like.

A side holding member mounting recess 55 is formed in each portion ranging from the side portion of the main mounting plate part 42 to the side securing plate part 54 (see FIG. 12). A portion 55a of the side holding member mounting recess 55 on the main mounting plate part 42 side is formed into a cut-out hole shape into which the mounting member 18 can be inserted, and a portion 55b of the side holding member mounting recess 55 on the side securing plate part 54 side is formed into a cut-out hole shape into which the holding member 60 can be inserted. Further, a bottom holding member mounting recess 57 is formed in a lower portion of the main mounting plate part 42. The bottom holding member mounting recess 57 is formed into a cut-out shape into which the mounting member 18 can be inserted. The side edge on one side of the bottom securing plate part 56 extends toward the cover 36 side so as to be continuous from the side portion on one side of the bottom holding member mounting recess 57. The pair of side holding member mounting recesses 55 and the bottom holding member mounting recess 57 are formed at the positions corresponding to the three mounting members 18.

The holding member 60 is a member formed of a non-conductive material such as a resin, and is configured to hold the locking body 70 on the mounting plate 40. More specifically, the holding member 60 is formed into a semi-cylindrical shape into which the mounting member 18 can be inserted along an axis direction. A securing groove 61 corresponding to the thickness of the main mounting plate part 42 is formed in the outer peripheral portion of the holding member 60, and locking protrusions 62 are formed on both outer peripheral side portions of the holding member 60. The locking protrusion 62 is formed as a protrusion having a height dimension gradually increasing from the center of the outer periphery of the holding member 60 toward the end portion side thereof.

The holding members 60 are respectively inserted into the pair of side holding member mounting recesses 55 and the bottom holding member mounting recess 57 from the outside. Then, the perimeter portion of the portion 55a of the side holding member mounting recess 55 on the main mounting plate part 42 side or the perimeter portion of the bottom securing plate part 56 is fitted into the securing groove 61 of the holding member 60. The locking protrusions 62 are locked with the both edges of the portions 55b of the side holding member mounting recess 55 on the side securing plate part 54 side or the edge on one side of the bottom securing plate part 56 from the inside. Accordingly, the holding members 60 are mounted and secured to the mounting plate 40.

In this mounting state, the inner space of the holding member 60 is located approximately at the same position as the portion 55a of the side holding member mounting recess 55 on the main mounting plate part 42 side or the bottom holding member mounting recess 57, in front view of the mounting plate 40. Accordingly, a plurality of mounting members 18 can be collectively inserted into the corresponding holding members 60.

Formed in the outer peripheral portion of each holding member 60 is a locking body holding groove 64 into which the locking body 70 can be inserted. It is preferable that the locking body holding groove 64 have approximately the same groove width as the diameter of the locking body 70 so as to hold the locking body 70 without rattling as little as possible in the orthogonal direction to the surface of the recess 46. The locking body holding groove 64 is formed at a position apart from (in this case, at a position slightly apart from) the surface of the recess 46 on the airbag 32 side in the state in which the holding member 60 is mounted to the mounting plate 40. The locking body 70 inserted into the locking body holding groove 64 is held in non-contact with the surface of the recess 46 on the airbag 32 side.

One end portion of the holding member 60 is disposed so as to protrude into the airbag housing space between the mounting plate 40 and the cover 36 in the state in which the holding member 60 is mounted. Then, the distal end portion of the portion of the holding member 60, which is disposed so as to protrude, is formed as an inclined surface 65 to be inclined having a height dimension gradually becoming smaller toward the inside of the airbag housing space. The inclined surface 65 is a portion having the function as an interference suppressing part, similarly to the inclined surface 22a of the mounting member 18. The inclined surface 65 is not necessarily required to be flat but may be curved.

That is, if the airbag 32 that is inflated and deployed in the airbag housing space comes into contact with the mounting members 18 and the holding members 60, the airbag 32 is guided toward the cover 36 side by the inclined surfaces 22a and the inclined surfaces 65. This prevents the interference between the airbag 32, and the mounting members 18 and the holding members 60. This stabilizes the operation of deploying the airbag 32.

The auxiliary biasing members 74 are secured to the mounting plate 40 at the positions so as to come into sliding contact with the pair of inclined wire portions 70c of the locking body 70.

That is, auxiliary biasing member securing holes 47 are formed at the positions in the mounting plate 40 that correspond to the pair of inclined wire portions 70c of the locking body 70. In this case, the auxiliary biasing member securing hole 47 is formed into a hole shape obtained by cutting a vertex of a triangle. A rotation prevention recess 47a is formed around the outer periphery of the auxiliary biasing member securing hole 47 (see FIG. 12).

The auxiliary biasing member 74 is a long member formed of a resin or the like, and has a configuration in which a sliding part 75, a plate part 76, a locking part 77, and a spring securing part 78 are provided from one end to the other end thereof (see, particularly, FIG. 12).

In this case, the plate part 76 is formed into a plate shape, in this case, a teardrop shape in which one end thereof has a round shape and the other end thereof is pointed, and is disposed in the periphery of the auxiliary biasing member securing hole 47 on the airbag 32 side. Formed on the surface of the plate part 76 on the side to be in contact with the mounting plate 40 is a rotation prevention protrusion 76a that can be fitted into the rotation prevention recess 47a.

The sliding part 75 is formed into an arced wall shape, and is provided in a protruding manner in a circular portion on one end side of the plate part 76, with the protruding-side portion thereof being directed to the pointed portion on the other end side of the plate part 76.

The locking part 77 is formed into a plate shape (plate shape obtained by cutting a vertex of a triangle) that can be inserted into the auxiliary biasing member securing hole 47. Formed between the locking part 77 and the plate part 76 is a gap 77a into which the peripheral portion of the auxiliary biasing member securing hole 47 of the mounting plate 40 can be wedged.

The spring securing part 78 is formed into a long shape so as to extend from the locking part 77 toward the side opposite to the sliding part 75. The spring securing part 78 has a configuration obtained by splitting a tubular member in three in this case, which is not necessarily required. In addition, a projection 78a that can be locked with a spring 79 is formed at the proximal end portion of the spring securing part 78. The spring 79 is fitted onto the spring securing part 78, so that the spring 79 is locked with and secured to the projection 78a in the state where one end of the spring 79 abuts against the locking part 77.

The auxiliary biasing member 74 is secured to the mounting plate 40 as described below. That is, the locking part 77 and the spring securing part 78 of the auxiliary biasing member 74 are inserted into the auxiliary biasing member securing hole 47 from the airbag 32 side. Then, the locking part 77 is caused to pass through the auxiliary biasing member securing hole 47, and then, the auxiliary biasing member 74 is appropriately rotated, so that the periphery of the auxiliary biasing member securing hole 47 is sandwiched between the plate part 76 and the locking part 77. On this occasion, the pointed portion on the other end side of the plate part 76 and the protruding-side portion of the sliding part 75 are directed toward the side wire portion 70b (downwardly). As a result, the pointed portion on the other end side of the plate part 76 is configured so as to be disposed between the recess 46 and the inclined wire portion 70c, and the protruding-side portion of the sliding part 75 is configured so as to come into sliding contact with the outwardly facing portion of the inclined wire portion 70c. In this securing state, the rotation prevention protrusion 76a formed on the plate part 76 is fitted into the rotation prevention recess 47a formed in the mounting plate 40. This enables the positioning when the auxiliary biasing member 74 is installed and prevents the auxiliary biasing member 74 from rotating after being installed.

The auxiliary biasing member 74 is secured to the mounting plate 40 in this manner, and then, the spring 79 is mounted and secured to the spring securing part 78. In this case, the auxiliary biasing member 74 is mounted also to the lower portion of the mounting plate 40. The auxiliary biasing member 74 provided at this position mainly serves to support the spring 79 at this position.

The locking body 70 is held on the mounting plate 40 by the holding members 60 as described below. The locking body 70 is disposed in the recess 46 of the mounting plate 40. In this state, the holding members 60 are mounted to the mounting plate 40 while inserting the locking body 70 into the locking body holding grooves 64 of the holding members 60. Accordingly, the locking body 70 is held on the mounting plate 40 on the airbag 32 side in the state in which the intermediate wire portion 70a is inserted to and held by the locking body holding groove 64 of the holding member 60 in the lower portion of the mounting plate 40 and the pair of side wire portions 70b are inserted into and held by the locking body holding grooves 64 of the holding members 60 on the both sides of the mounting plate 40. In this state, the locking body 70 is held on the mounting plate 40 in a non-contact manner by the holding members 60. In this case, a more reliable non-contact state between the locking body 70 and the mounting plate 40 is kept also by the auxiliary biasing members 74.

Needless to say, the locking body 70 may be held on the mounting plate 40 after mounting the holding members 60 to the mounting plate 40. In this case, in the state in which the pair of side wire portions 70b are pushed to be close to each other, the intermediate wire portion 70a of the locking body 70 is inserted into the locking body holding groove 64 of the holding member 60 mounted to the lower portion of the mounting plate 40, and the pair of side wire portions 70b thereof are inserted into the locking body holding grooves 64 of the holding members 60 mounted to the both sides of the mounting plate 40. Then, it suffices that the force for pushing the pair of side wire portions 70b to be closer to each other is released.

In the above-mentioned state, the pair of side wire portions 70b are biased in the direction in which they become apart from each other by the elastic force of the locking body 70 itself. This biasing force acts as the force for pushing the pair of side wire portions 70b outwardly so as to be locked with the mounting members 18 corresponding thereto.

Figure 13:
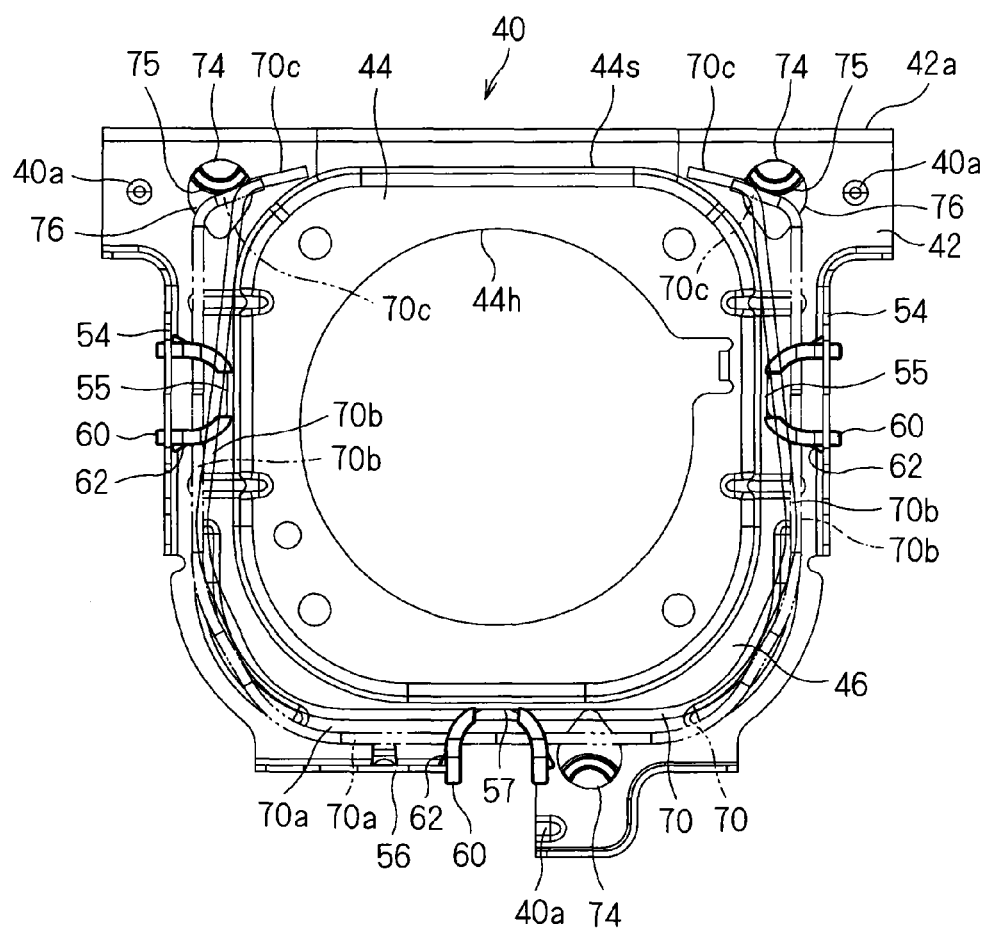
FIG. 13 is an explanatory view showing an operation of the locking body.

FIG. 13 is an explanatory view showing the operation of the locking body 70. FIG. 13 shows the locking body 70 in a normal state by a chain double-dashed line and the locking body 70 moved upwardly by a solid line.

First, in the normal mounting state of the locking body 70, the inclined wire portions 70c are in contact with the protruding-side portions of the sliding parts 75. The locking body 70 is moved upwardly in this state, whereby the inclined wire portions 70c are pulled inwardly while being in sliding contact with the protruding-side portions of the sliding parts 75. As a result, the pair of side wire portions 70b are pushed to be close to each other against the elastic force of the locking body 70 itself. Then, the force for upwardly moving the locking body 70 is released, whereby the pair of side wire portions 70b are caused to be apart from each other by the elastic force of the locking body 70 itself. This causes the inclined wire portions 70c to come into sliding contact with the protruding-side portions of the sliding parts 75 while moving outwardly. Then, the locking body 70 is biased toward the locking body holding groove 64 of the holding member 60 in the lower portion. This biasing force acts as the force for pushing the intermediate wire portion 70a outwardly so as to be locked with the corresponding mounting member 18.

As described above, the locking body 70 is held on the mounting plate 40 in such a manner that the biasing force acts in the direction in which the locking body 70 is locked with each of the mounting members 18.

In the state in which the locking body 70 is moved upwardly to abut against the step 44s, the position of the locking body holding groove 64 of the holding member 60 and the position of the step 44s are set such that the pair of side wire portions 70b do not become detached from the locking body holding grooves 64 of the corresponding holding members 60. This prevents the locking body 70 from becoming detached inadvertently.

It is preferable that in the state in which the locking body 70 is mounted, more than a half of the cross section of the locking body 70 should not protrude from the surface of the inflator mounting plate part 44 on the airbag 32 side. In other words, it is preferable that more than a half of the cross section of the locking body 70 be located on the airbag 32 side with respect to the surface of the inflator mounting plate part 44 on the airbag 32 side.

Figure 14:
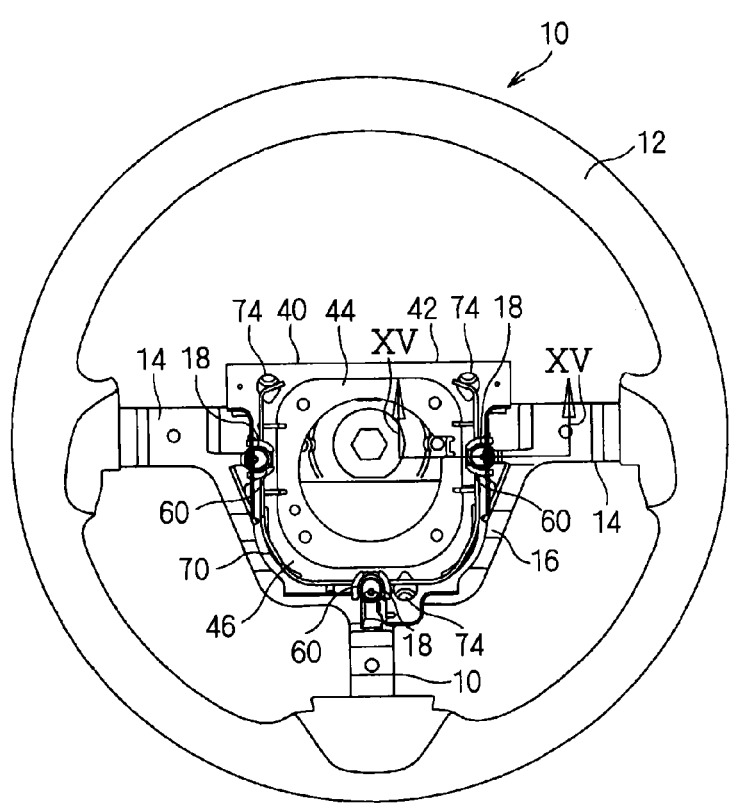
FIG. 14 is a front view showing a state in which the mounting plate is mounted to the steering wheel.
Figure 15:
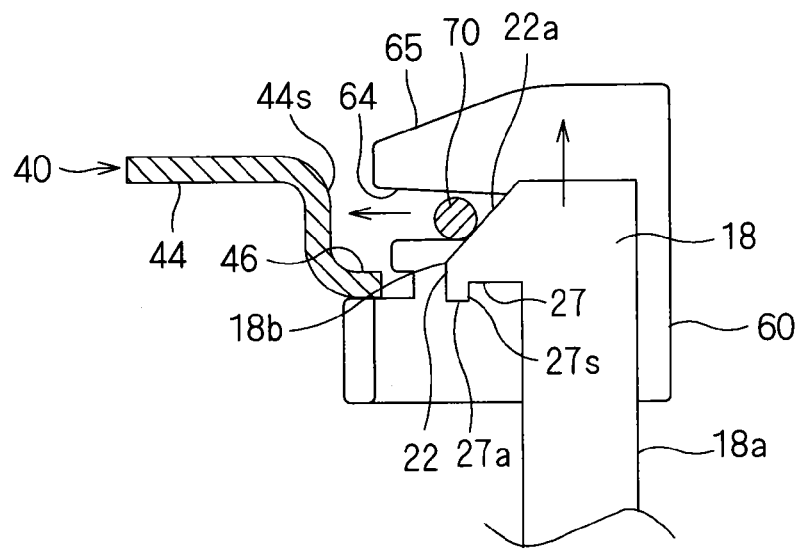
FIG. 15 is an explanatory view showing an operation in which the mounting member is locked with the locking body, which is taken along the line XV-XV of FIG. 14.
Figure 16:
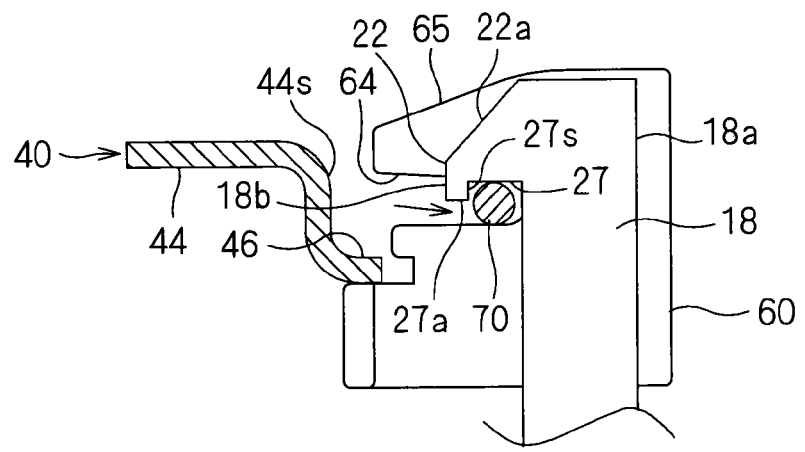
FIG. 16 is another explanatory view showing the operation in which the mounting member is locked with the locking body, which is taken along the line XV-XV of FIG. 14.
Figure 17:
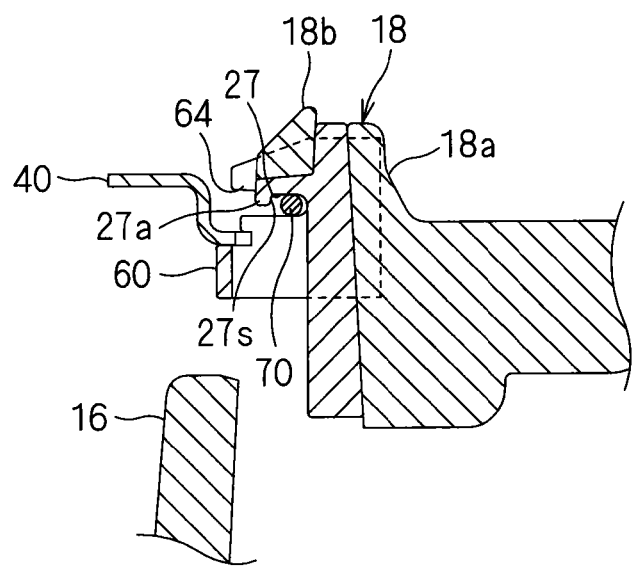
FIG. 17 is a cross-sectional view taken along the line XV-XV of FIG. 14.

FIG. 14 is a front view showing a state in which the mounting plate 40 is mounted to the steering wheel 10, FIGS. 15 and 16 are explanatory views showing the operation in which the mounting member 18 is locked with the locking body 70, which is taken along a line XV-XV of FIG. 14, and FIG. 17 is a cross-sectional view taken along the line XV-XV of FIG. 14. For the sake of description, FIGS. 15 and 16 show the mounting body member 20 and the cap member 24 integrated with each other.

As shown in these figures, each mounting member 18 is inserted into the holding member 60 secured to the mounting plate 40 from the steering wheel 10 side, to thereby being locked with the locking body 70 in the holding member 60.

That is, the airbag device 30 is pushed toward the steering wheel 10 such that each mounting member 18 is inserted into the holding member 60 corresponding thereto. Then, the inclined surface 22a at the distal end portion of the mounting member 18 comes into contact with the locking body 70 (see FIG. 15). Accordingly, the locking body 70 is elastically deformed so as to be pushed toward the inside thereof by the inclined surface 22a. Then, the locking body 70 returns elastically after going beyond the locking protrusion 18b and the slip-off prevention protrusion 27a of the mounting member 18 (see FIG. 16). Then, the locking body 70 abuts against the corner portion inside the column part 18a and the locking protrusion 18b, that is, the locking abutment surface 27 on the proximal end side with respect to the slip-off prevention protrusion 27a. This results in that the mounting member 18 is locked with the locking body 70 so as not to slip off (see FIG. 17). The above is performed collectively or sequentially between the plurality of mounting members 18 and the portions of the locking body 70 in the corresponding holding members 60. Accordingly, the locking body 70 is locked so as not to slip off in the holding members 60 corresponding to the plurality of mounting members 18, resulting in that the airbag device 30 is mounted and secured to the steering wheel 10.

In the above-mentioned state, the locking body 70 abuts against the locking abutment surface 27 on the proximal end side with respect to the slip-off prevention protrusion 27a. For this reason, even if the force for making the locking body 70 wider, for example, the force for moving the locking body 70 to the distal end side of the locking protrusion 18b is exerted when, for example, the airbag 32 is inflated and deployed, the locking body 70 abuts against the slip-off prevention protrusion 27a while moving in that direction. Accordingly, the locking body 70 is prevented from moving to the distal end side of the locking protrusion 18b, which prevents the locking between the locking body 70 and the mounting member 18 from being released.

Figure 18:
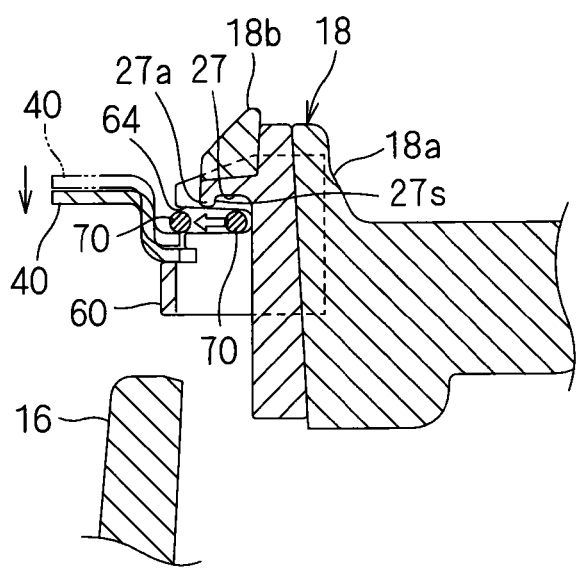
FIG. 18 is an explanatory view showing an operation of demounting the locking body from the mounting member, which is taken along the line XV-XV of FIG. 14.

Meanwhile, the airbag device 30 is demounted from the steering wheel 10 as described below. First, in the normal state, the locking body 70 is unlikely to be detached from the locking protrusion 18b by the action of the slip-off prevention recess 27a (a kind of self-locked state). For this reason, if only the locking body 70 is moved in the releasing direction without pushing the airbag device 30, the locking between the locking body 70 and the mounting member 18 is not normally released. Therefore, in the case of demounting the airbag device 30, first, the airbag device 30 is pushed such that the mounting plate 40 moves to the distal end side of the mounting member 18 as shown in FIG. 18. Then, the locking body 70 moves to the distal end side of the mounting member 18 together with the mounting plate 40 because the locking body 70 is held on the mounting plate 40 via the holding members 60. This causes the locking body 70 to be apart from the locking abutment surface 27. In this state, the locking body 70 is inwardly pushed in a successive manner, whereby the locking body 70 easily goes beyond the slip-off prevention protrusion 27a and moves outwardly on the distal end side of the locking protrusion 18b. Accordingly, the locking between the mounting member 18 and the locking body 70 is released, which enables to demount the airbag device 30 from the steering wheel 10.

In the state where the airbag device 30 is mounted, the springs 79 are arranged between the core member 16 of the steering wheel 10 and the mounting plate 40 in a compressed state. The springs 79 serve to bias the mounting plate 40 in a direction in which the mounting plate 40 becomes apart from the core member 16 of the steering wheel 10. The biasing force prevents rattling between the core member 16 of the steering wheel 10 and the mounting plate 40.

Further, in the normal state, the biasing force keeps the core member 16 of the steering wheel 10 and the mounting plate 40 in a non-contact state. In the present embodiment, with the use of the above, a horn switch structure is incorporated in the core member 16 of the steering wheel 10 and the mounting plate 40.

That is, at least one securing-side contact part 16a is provided in the core member 16 so as to be exposed to the mounting plate 40 side. The present embodiment assumes the case in which three securing-side contact parts 16a are provided, though FIG. 1 shows only one of them. In addition, moving-side contact parts 40a are provided at the positions opposed to the securing-side contact parts 16a in the mounting plate 40 (see FIGS. 1, 8, and 9). There is incorporated a horn blow circuit that is turned on/off by the securing-side contact parts 16a and the moving-side contact parts 40a. In the state in which the airbag device 30 is mounted to the steering wheel 10, the securing-side contact part 16a and the moving-side contact part 40a are not in contact with each other by the biasing force of the spring 79, which are in a non-conductive state. When a driver pushes the cover 36 in this state, the mounting plate 40 is pushed toward the core member 16 side of the steering wheel 10 against the biasing force of the spring 79. As a result, the moving-side contact part 40a comes into contact with the corresponding securing-side contact part 16a, and they enter a conductive state. This makes a horn blow.

Needless to say, the horn switch structure is not required to be incorporated in this portion, but a horn switch may be incorporated in the surface portion of the cover 36.

According to the mounting part structure for the airbag device configured as described above, the locking body 70 is held on the proximal-end-portion side of the locking protrusion 18b by the slip-off prevention protrusion 27a of the locking protrusion 18b. This enables to keep the locking state between the locking body 70 and the mounting member 18 more reliably, whereby the state in which the airbag device 30 is mounted can be kept more reliably.

The locking body 70 is formed of a metal wire that can be elastically deformed, which enables to generate the biasing force on the mounting member 18 by the elastic force of the elastic body 70 itself. In addition, the biasing force increases the force for keeping the locking between the mounting member 18 and the locking body 70, so that the state in which the airbag device 30 is installed can be kept more reliably.

The mounting member 18 includes the mounting body member 20 integrally formed with the core member 16, and the cap member 24 mounted to the mounting body member 20. This enables to secure adequate rigidity by the mounting body member 20 formed of metal and insulate the mounting body member 20 and the locking body 70 from each other by the cap member 24 formed of a resin. Accordingly, it is possible to incorporate a horn switch structure as described above by insulating the core member 16 and the mounting plate 40 from each other.

When the cap member 24 is caused to pass through the through hole 16h, the end plate part 26 abuts against the locking body protrusion 22, and the pair of slip-off prevention pieces 25b abut against the periphery of the through hole 16h. Accordingly, the cap member 24 is mounted to the mounting body member 20. This enables to easily mount the cap member 24 to the mounting body member 20.

In particular, there are many manufacturing advantages in that a part count can be reduced by forming the mounting body member 20 integrally with the core member 16, and that the insulating structure by means of the cap member 24, and further, the slip-off prevention protrusion 27a structure by means of the cap member 24 can be later incorporated in the mounting body member 20 with ease.

Moreover, the positioning protrusion 26a is fitted into the positioning recess 22b in this state, which enables to keep the cap member 24 at a constant position more reliably.

In the present embodiment, the horn switch structure is incorporated in the core member 16 of the steering wheel 10 and the mounting plate 40. This requires that the core member 16 and the mounting plate 40 be not in electrical contact with each other in the normal state. Therefore, the holding members 60 made of resin hold the locking body 70 in the present embodiment. This results in that the holding members 60 are arranged between the mounting plate 40 and the locking body 70, so that the non-conductive state between the mounting plate 40 and the locking body 70 is kept. In addition, more reliable non-contact state between the locking body 70 and the mounting plate 40 is kept also by the auxiliary biasing members 74. Further, the mounting member 18 is configured such that the cap member 24 made of resin is mounted to the mounting body member 20 integrally formed with the core member 16. Accordingly, the cap member 24 is arranged between the core member 16 and the locking body 70, which keeps the non-conductive state also between the core member 16 and the locking body 70. That is, a physical contact between some members is unavoidable in the securing structure of the steering wheel 10 and the mounting member 18, and thus, the present embodiment achieves a double insulation structure with the holding members 60 and the cap members 24. This secures more reliable insulating properties between the core member 16 of the steering wheel 10 and the mounting plate 40.

The holding member 60 and the cap member 24 have the function of preventing rattling between the respective members irrespective of whether or not the horn switch structure is incorporated.

<Modifications>

The embodiment above has described the example in which the slip-off prevention protrusion 27a has a protrusion shape to protrude at the distal end portion of the locking abutment surface 27, which is not necessarily required.

Figure 19:
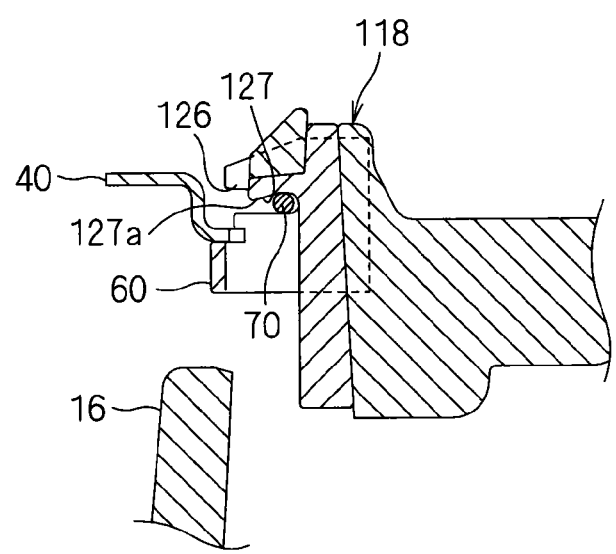
FIG. 19 is an explanatory view showing a modification of a slip-off prevention protrusion.
Figure 20:
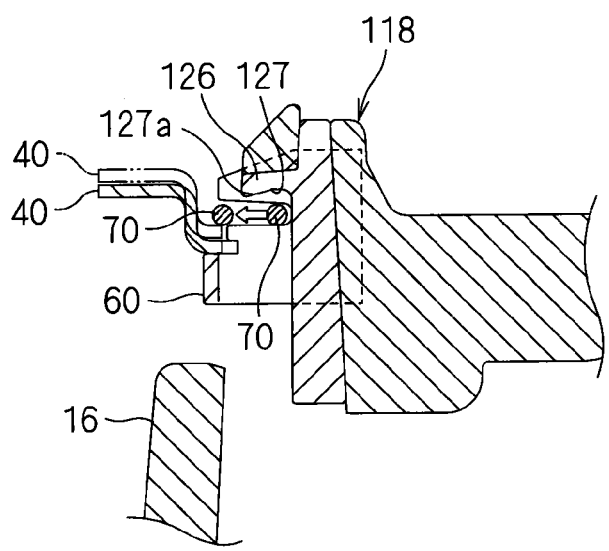
FIG. 20 is another explanatory view showing the modification of the slip-off prevention protrusion.

For example, in a mounting member 118 shown in FIGS. 19 and 20, a slip-off prevention protrusion 127a may be formed in an inclined protrusion shape to protrude gradually from the proximal end portion of a locking abutment surface 127 (inwardly facing surface of an end plate part 126 corresponding to the end plate part 26) toward the distal end side thereof. That is, it suffices that the slip-off prevention protrusion is formed in a shape to protrude beyond the proximal end portion of a locking abutment surface so as to prevent a locking body from moving toward the distal end side of the locking abutment surface beyond the proximal end portion thereof.

The embodiment above has described the example in which the locking body 70 is provided on the airbag device 30 side and the mounting members 18 are provided on the steering wheel 10 side. On the contrary, mounting members may be provided on the airbag device side and a locking body may be provided on the steering wheel side.

The embodiment above has described the example in which the mounting member 18 is composed of the mounting body member 20 and the cap member 24, which is not necessarily required.

Figure 21:
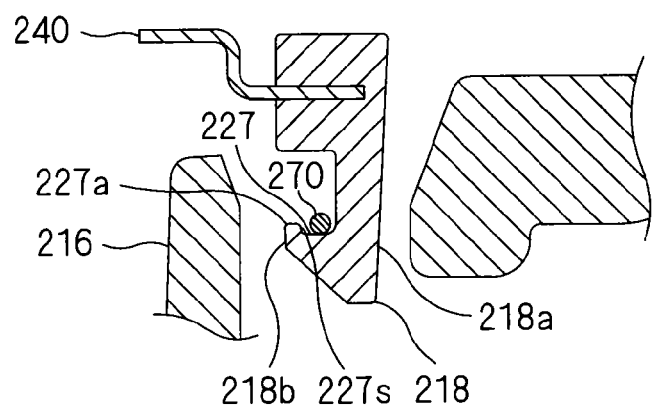
FIG. 21 is an explanatory view showing a modification of the mounting member and the locking body.
Figure 22:
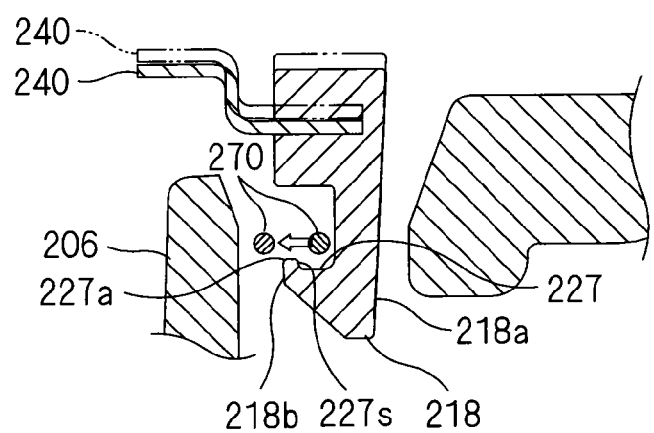
FIG. 22 is another explanatory view showing the modification of the mounting member and the locking body.

FIGS. 21 and 22 show the example in which a mounting member 218 is provided to a mounting plate 240 corresponding to the mounting plate 40, a locking body 270 corresponding to the locking body 70 is provided on a core member 216 side corresponding to the core member 16 on the steering wheel side, and further, the mounting member 218 is formed as an integrally formed member.

That is, the mounting member 218 is mounted to the outer perimeter of the mounting plate 240. The mounting member 218 is an integrally formed member made of metal or resin, and has a configuration in which a locking protrusion 218b is provided in a protruding manner to the distal end portion of a column part 218a extending from the mounting plate 240 toward the core member 216 side.

A locking abutment surface 227 of the locking protrusion 218b, which faces the proximal end portion of the column part 218a, includes a slip-off prevention protrusion 227a. Similarly to the slip-off prevention protrusion 27a according to the embodiment above, the slip-off prevention protrusion 227a is formed into a protrusion shape to protrude, via a step 227s, at the distal end portion of the locking abutment surface 227 apart from the proximal end portion thereof toward the distal end side of the locking abutment surface 227 by a larger amount than the diameter of the locking body 270.

Meanwhile, the locking body 270 is held on the core member 216 in a manner of exerting a biasing force on the proximal-end-portion side of the locking protrusion 218b.

The locking body 270 is configured to go beyond the locking protrusion 218b and abut against the proximal end portion of the locking abutment surface 227 when the mounting member 18 is pushed toward the steering wheel 10 side.

In this state, the movement of the locking body 270 toward the distal end side of the locking abutment surface 227 is suppressed by the slip-off prevention protrusion 27a as in the case of the embodiment above (see FIG. 21).

Meanwhile, when the airbag device is pushed further, the locking body 270 becomes apart from the locking abutment surface 227, so that the locking body 270 easily goes beyond the slip-off prevention protrusion 227a and easily moves outwardly on the distal end side. As a result, the locking between the mounting member 218 and the locking body 270 is released, so that the airbag device is demounted from the steering wheel.

Figure 23:
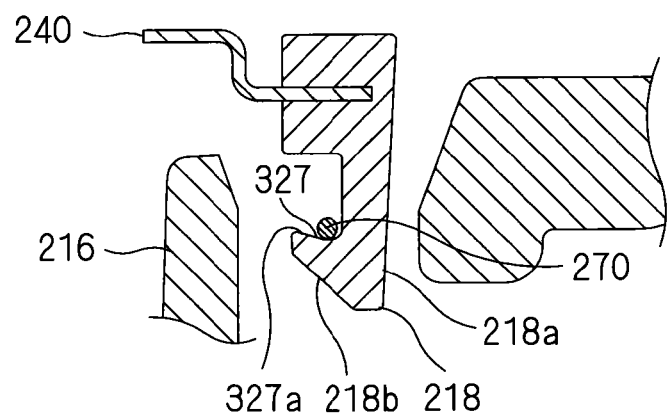
FIG. 23 is an explanatory view showing another modification of the mounting member and the locking body.
Figure 24:
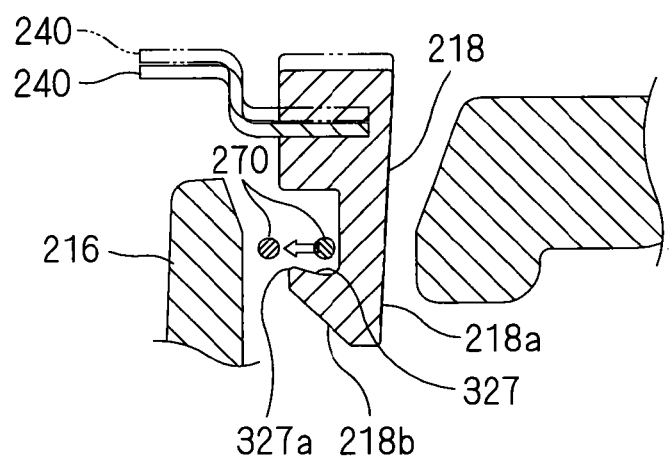
FIG. 24 is another explanatory view showing the another modification of the mounting member and the locking body.

FIGS. 23 and 24 show another modification of FIGS. 21 and 22 above. In this example, a slip-off prevention protrusion 327a is formed into an inclined protrusion shape to protrude gradually from the proximal end portion of the locking abutment surface 327 toward the distal end side thereof. Similarly to the above, it is possible to prevent the locking body 270 from moving from the proximal end portion of the locking abutment surface 327 toward the distal end side thereof also in this case.

Even in a case where a cap member is provided, the configuration for mounting the cap member to a mounting body member is not limited to the above-mentioned example. It may be, for example, an example in which a mounting body member is provided as an insert and a mounting member is formed by molding, or an example in which a cap member is mounted to a column part so as to be held thereby.

The spring 79 is not necessarily required. For example, the spring 79 itself may be not provided in a case where the switch structure is not incorporated. Alternatively, a spring may be replaced with another elastic member such as rubber.

The configuration of a locking body is not limited to the above-mentioned example as well. For example, a locking body may be configured such that the mounting member 18 is locked with a torsion-coil-spring-like or plate-spring-like locking body.

The position of a locking body is not limited to the above-mentioned example as well. It suffices that at least one locking body is provided in at least one mounting member provided for enabling locking.

The locking configuration of a mounting member and a locking body is not limited to the above-mentioned example. For example, a locking body may be configured to be locked with a mounting member from the outer peripheral side.

While the present invention has been described in detail, the foregoing description is in all aspects illustrative, and the present invention is not limited thereto. That is, numerous modifications and variations can be devised in the described aspects without departing from the scope of the invention.

DESCRIPTION OF REFERENCE SYMBOLS 10 steering wheel
12 wheel main body
16, 216 core member
16h through hole
18, 218 mounting member
18a, 218a column part
20 mounting body member
21 column body part
22 locking body protrusion
24 cap member
25 side plate part
25b slip-off prevention piece
26, 126 end plate part
26a protrusion
27, 127, 227, 327 locking abutment surface
27a, 127a, 227a, 327a slip-off prevention protrusion
30 airbag device
32 airbag
34 inflator
36 cover
40, 240 mounting plate
70, 270 locking body
60 holding member

The invention claimed is:

1. A mounting part structure for an airbag device, for mounting an airbag device to a steering wheel, comprising:
  an airbag device including an airbag, an inflator configured to inflate and deploy said airbag, a cover covering said airbag folded, and a mounting plate to which said airbag, said inflator, and said cover are secured; and
  a steering wheel including a wheel main body, and a central member provided at the center of said wheel main body, wherein:
  a mounting member is provided on any one of said mounting plate side and said central member side;
  a locking body configured to be locked with said mounting member is provided on the other of said mounting plate side and said central member side;
  said mounting member includes a column part and a locking protrusion, the column part extending from any one of said mounting plate side and said central member side to the other thereof, the locking protrusion being provided in a protruding manner to a distal end portion of said column part;
  said airbag device is mounted to said steering wheel upon locking of said locking body with an inner corner portion between said column part and said locking protrusion of said mounting member; and
  a locking abutment surface of said locking protrusion includes a slip-off prevention protrusion holding said locking body on a proximal-end-portion side of said locking protrusion, the locking abutment surface facing a proximal-end-portion side of said column part.

2. The mounting part structure for an airbag device according to claim 1, wherein said slip-off prevention protrusion is formed as a protrusion protruding at a distal end portion of said locking abutment surface or an inclined protrusion protruding gradually from a proximal end portion of said locking abutment surface toward the distal end portion thereof.

3. The mounting part structure for an airbag device according to claim 1, wherein said locking body is formed of a metal wire configured to be elastically deformed, and is held on said mounting plate or said central member so as to exert a biasing force on the proximal-end-portion side of said locking protrusion of said mounting member.

4. The mounting part structure for an airbag device according to claim 1, wherein:
  said mounting member includes:
    a mounting body member formed of metal and including a column body part and a locking body protrusion protruding from said column body part; and
    a cap member formed of a non-conductive member and including a side plate part and an end plate part, the side plate part covering a surface of said column body part on the side on which said locking body protrusion protrudes, the end plate part covering an inwardly facing surface of said locking body protrusion; and
  said slip-off prevention protrusion is formed in said cap member.

5. The mounting part structure for an airbag device according to claim 4, wherein:
  a through hole is formed to be opposed to said locking body protrusion, on said mounting plate side or said central member side on which said mounting body member is formed;
  said side plate part includes a slip-off prevention piece inclined outwardly toward a proximal end thereof, and said cap member is formed so as to be inserted into said through hole while elastically deforming said slip-off prevention piece inwardly; and
  said cap member is mounted to said mounting body member in a state in which said end plate part abuts against said locking body protrusion and said slip-off prevention piece abuts against a periphery of said through hole.

6. The mounting part structure for an airbag device according to claim 4, wherein a positioning recess is formed in the inwardly facing surface of said locking body protrusion, and a positioning protrusion configured to be fitted into said positioning recess is formed in said end plate part, said positioning protrusion being fitted into said positioning recess in a state in which said cap member is mounted to said mounting body member.

7. The mounting part structure for an airbag device according to claim 1, wherein:
   said locking body is provided in said mounting plate; and
   said mounting member is provided in said central member.

8. The mounting part structure for an airbag device according to claim 1, further comprising a holding member formed of a non-conductive member and holding said locking body in a non-contact state with said mounting plate or said central member.

* * * * *